(12) United States Patent
Riggin

(10) Patent No.: US 6,422,728 B1
(45) Date of Patent: Jul. 23, 2002

(54) SAFETY LIGHT

(76) Inventor: Russel A. Riggin, 2101 Galaxy Dr., Altus, OK (US) 73521

( * ) Notice: Subject to any disclaimer, the term of this patent is extended or adjusted under 35 U.S.C. 154(b) by 33 days.

(21) Appl. No.: 09/616,184

(22) Filed: Jul. 14, 2000

Related U.S. Application Data

(60) Provisional application No. 60/143,966, filed on Jul. 15, 1999.

(51) Int. Cl.[7] .................................................. B60Q 1/22
(52) U.S. Cl. ........................ 362/540; 362/545; 362/259; 362/485; 362/478; 362/505; 340/932.2; 340/475
(58) Field of Search .................................. 362/485, 478, 362/540, 545, 259, 505; 340/431, 465, 475, 932.2

(56) References Cited

U.S. PATENT DOCUMENTS

| | | | |
|---|---|---|---|
| 2,193,063 A | | 3/1940 | Dettweiler .................. 240/8.2 |
| 4,645,315 A | | 2/1987 | Morgavo ..................... 350/600 |
| 5,017,903 A | | 5/1991 | Krippelz, Sr. ................ 340/472 |
| 5,101,326 A | | 3/1992 | Roney .......................... 362/61 |
| 5,209,559 A | * | 5/1993 | Ruppel ......................... 362/80 |
| 5,351,171 A | * | 9/1994 | Bushey ......................... 362/80 |
| 5,428,512 A | | 6/1995 | Mouzas ........................ 362/80 |
| 5,430,625 A | * | 7/1995 | Abarr et al. ................... 362/80 |
| 5,467,071 A | * | 11/1995 | Koeing ........................ 340/433 |
| 5,682,138 A | | 10/1997 | Powell et al. ................ 340/475 |
| 5,782,549 A | * | 7/1998 | Glatzmeier ................... 362/80 |
| 6,037,866 A | * | 3/2000 | Leibowitz .................... 340/473 |
| 6,084,507 A | * | 4/2000 | Butler et al. ................. 340/437 |
| 6,089,588 A | * | 7/2000 | Lesesky et al. ............. 280/422 |
| 6,095,663 A | * | 8/2000 | Pond et al. .................. 362/247 |
| 6,203,181 B1 | * | 3/2001 | Gross .......................... 362/486 |
| 6,280,057 B1 | * | 8/2001 | O'Meara ..................... 362/259 |

* cited by examiner

*Primary Examiner*—Sandra O'Shea
*Assistant Examiner*—Anabel Ton
(74) *Attorney, Agent, or Firm*—Dunlap, Codding & Rogers, P.C.

(57) ABSTRACT

A safety light for a vehicle is provided. The safety light includes a housing defining a retaining space. The housing is mountable to the vehicle proximate the rear end thereof. The safety light further includes a light source supported within the retaining space of the housing such that the light source projects a visual line of reference from the housing and onto a roadway on which the vehicle is traveling substantially coextensive to the rear end of the vehicle and perpendicular to the direction of travel of the vehicle so that the driver of the vehicle is able to determine the position of an adjacent obstacle relative to the rear end of the vehicle.

20 Claims, 3 Drawing Sheets

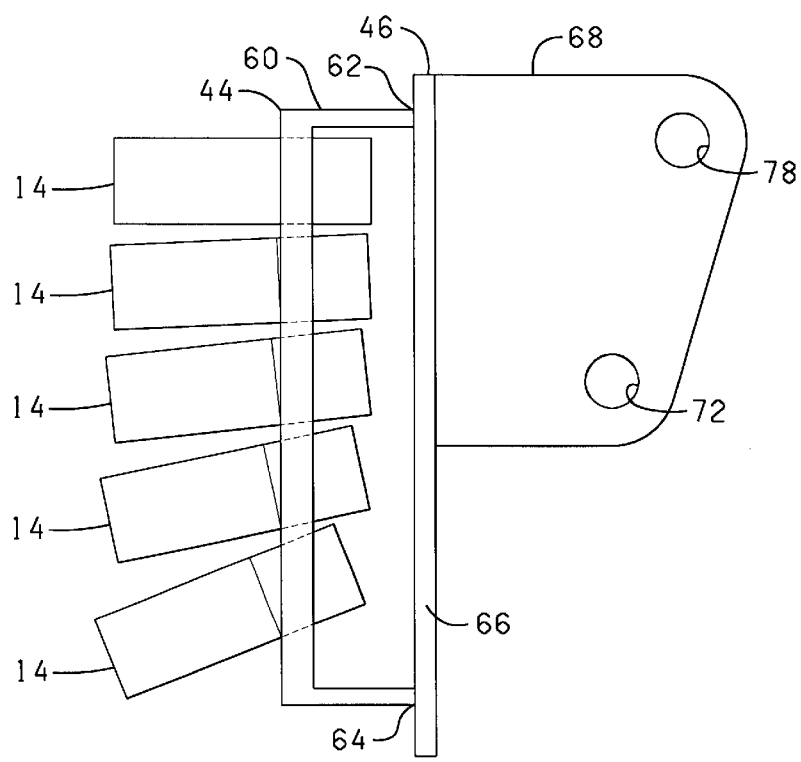
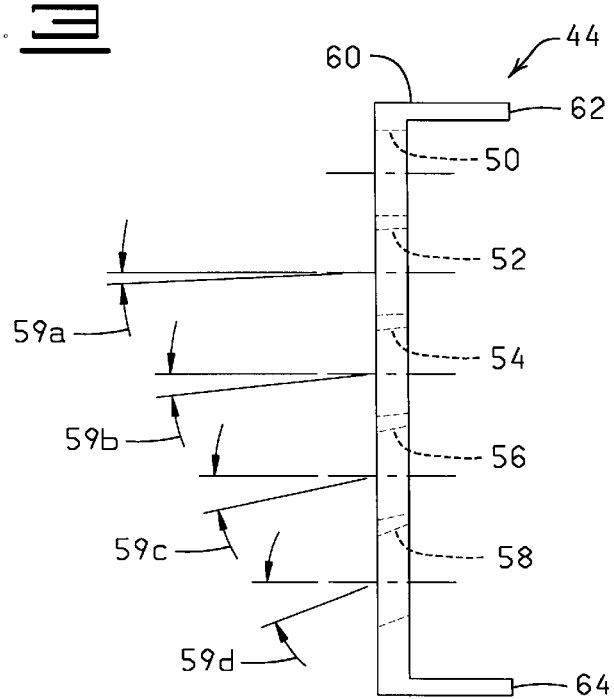

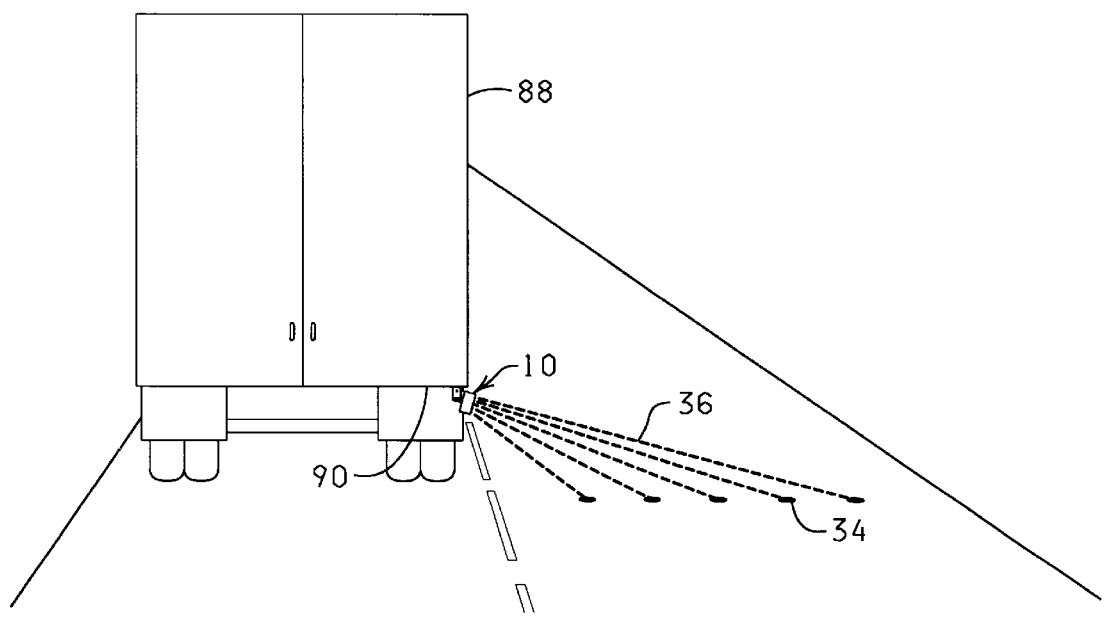
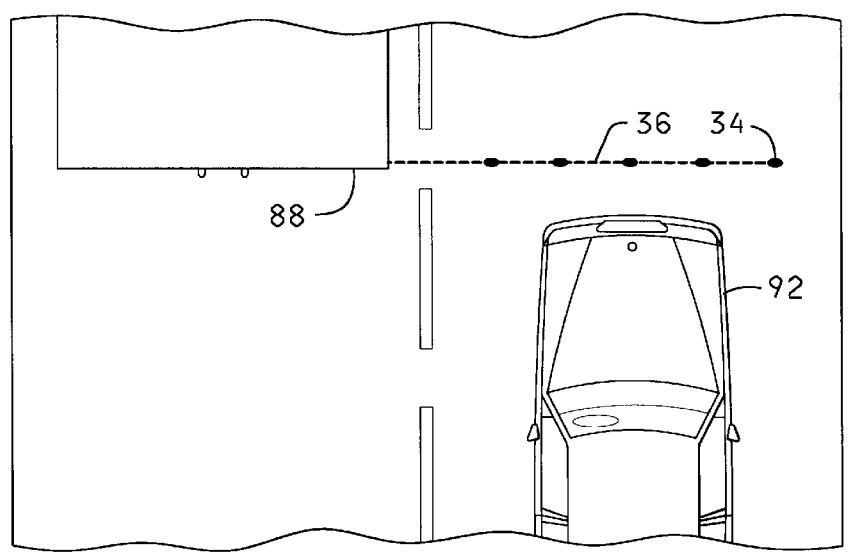

SAFETY LIGHT

CROSS-REFERENCE TO RELATED APPLICATIONS

This application claims the benefit of U.S. Provisional Application Serial No. 60/143,966, filed Jul. 15, 1999.

BACKGROUND OF THE INVENTION

1. Field of the Invention

The present invention relates generally to lights, and more particularly, but not by way of limitation, to a safety light for projecting a light beam onto the roadway adjacent to a vehicle to provide a visual line of reference.

2. Brief Description of the Related Art

Devices which aid a driver in viewing regions surrounding a car or truck are well known in the art. More specifically, automobile manufacturers equip vehicles with features such as side and rear view mirrors to allow drivers to view other vehicles which are located beside or behind their vehicle. While side view and rear view mirrors are helpful for viewing nearby vehicles, it is nevertheless difficult for drivers to judge the distance of their vehicles from another vehicle by only looking into the mirror. As such, drivers are often unsure whether it is safe to change lanes. This problem is increased several fold when the vehicle being driven is a truck having a long tractor trailer attached thereto. This depth perception problem is further compounded at night. Therefore, a need exists for a device for projecting a light beam onto the roadway adjacent to a vehicle to provide a visual line of reference. It is to such a device that the present invention is directed.

SUMMARY OF THE INVENTION

The present invention is directed to an apparatus for attaching to the rear of a trailer or long vehicle for projecting a visual line of reference onto the surface of the road at the rear end of a vehicle. Broadly, the apparatus includes a housing, at least one light source, and a light source mount assembly.

The housing is provided with a top end, a bottom end, a first side, and a second side defining a retaining space. The light source is mounted in the retaining space of the protective housing by the light source mount assembly such that the light source projects a visual line of reference from the housing and onto the surface of the road substantially coextensive to the rear end of the vehicle and perpendicular to the direction of travel of the vehicle so that the driver of the vehicle is able to determine the position of an adjacent obstacle relative to the rear end of the vehicle.

This line of reference should be beneficial in reducing accidents caused by lane changes. Other features and advantages of the present invention will become apparent from the following detailed description when read in conjunction with the accompanying drawings and appended claims.

BRIEF DESCRIPTION OF THE SEVERAL VIEWS OF THE DRAWINGS

FIG. 3 is a side elevational view of a light source mount assembly of the apparatus attached to a set of five light sources.

FIG. 4 is a side elevational view of a light source mounting bracket.

FIG. 5 is a rear view of a trailer diagrammatically illustrating the apparatus of the present invention attached to the rear end of a trailer and projecting a visual line of reference onto a portion of the roadway on which the trailer is traveling.

FIG. 6 is a top, diagrammatic view a trailer and an automobile illustrating the apparatus of the present invention attached to the rear end of a trailer and projecting a visual line of reference onto a portion of the roadway on which the trailer is traveling.

DETAILED DESCRIPTION OF THE INVENTION

Figure 1:
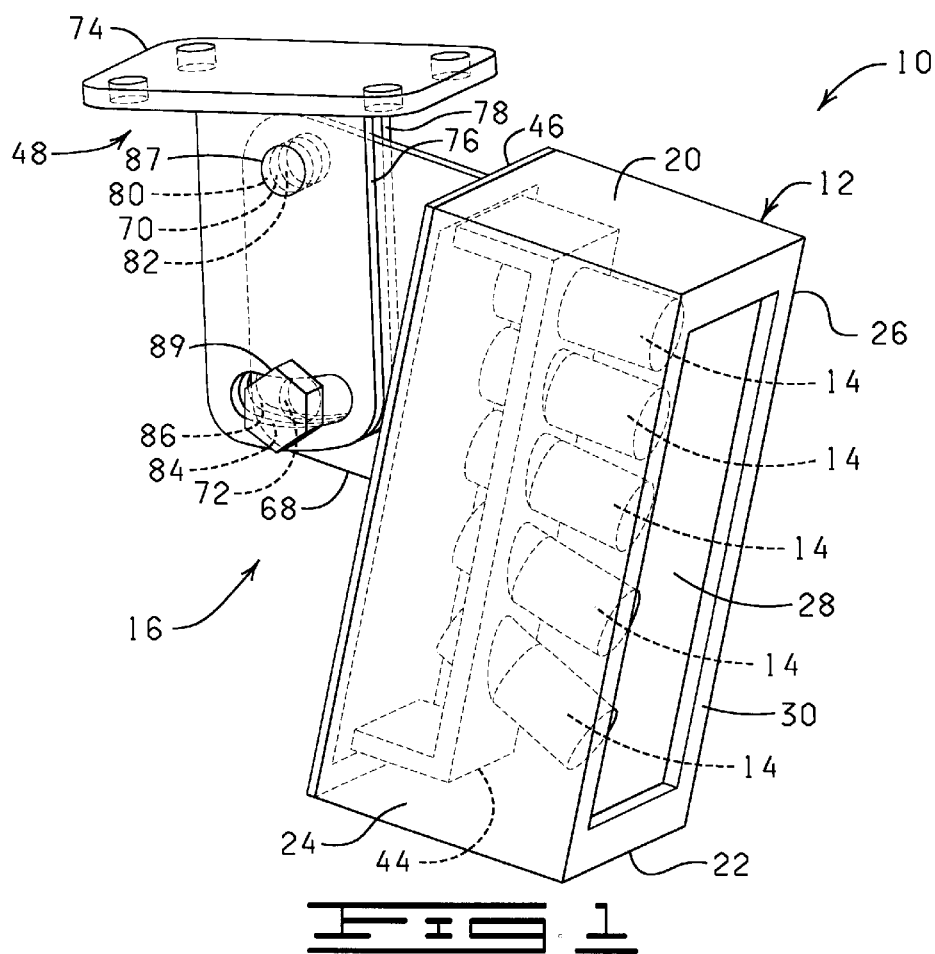
FIG. 1 is a perspective view of an apparatus constructed in accordance with the present invention.

Referring now to the drawings, and more particularly to FIG. 1, shown therein is an apparatus 10 constructed in accordance with the present invention. The apparatus 10 is attachable to the rear end of a trailer or vehicle for projecting a beam of light onto a roadway on which the vehicle is traveling substantially coextensive to the rear end of the trailer or vehicle substantially perpendicular to the direction of travel of the vehicle to provide a visual line of reference. The apparatus 10 includes a housing 12, at least one light source 14, and a light source mount assembly 16.

The housing 12 has a top end 20, a bottom end 22, a first side 24, and a second side 26 defining a retaining space 28. The retaining space 28 extends through the housing 12 from an open front side 30 to an open back side 32. The light sources 14 are mounted in the retaining space 28 of the housing 12 by the light source mount assembly 16. As shown in FIG. 1, five light sources 14 are mounted in the retaining space 28 of the housing 12. A suitable light source is a laser pointer, which produces a focused beam of light rather than a diffusing beam of light. The use of the light sources 14 will form a line of spots or a dotted line of reference 34 (FIG. 5) across the roadway.

A beam of light 36 (shown in FIGS. 5 and 6) is emitted from each of the light sources 14 (FIG. 1). Each beam of light 36 must be bright enough for the driver to see the line of reference 34 clearly in the rear or side view mirror. In addition, the beams of light 36 must be of such intensity that if inadvertently shined directly into another driver's eyes at a short distance, the beams of light 36 will not cause any temporary blindness or affect visual acuity. The beams of light 36 may be clear or colored; the color of the beams of light 36 will affect the brightness of the line of reference 34 and thus the visibility of the line of reference 34. Desirably, a wavelength of 635 nm will be emitted from the light sources 14.

Each light source 14 desirably has an output power of 3.5 mW, runs on a 12 volt battery and needs 50 to 120 mA of current. In addition, each light source 14 is desirably operational at temperatures ranging from –18 to 104 degrees F, while able to be safely stored at a range of –72 to 185 degrees F.

While the apparatus 10 has been specifically described above as including a plurality of light sources, it should be understood that the use of a single light source which produces a single beam of light is contemplated by the present invention. For example, the light source can be a single bulb which produces a single diffusing beam of light. A lens or a shade with a vertically oriented slot can be used to focus the beam of light onto the roadway so as to project a visual line of reference which extends substantially coextensive from the rear end of the vehicle and substantially perpendicular to the direction of travel of the vehicle.

Figure 2:
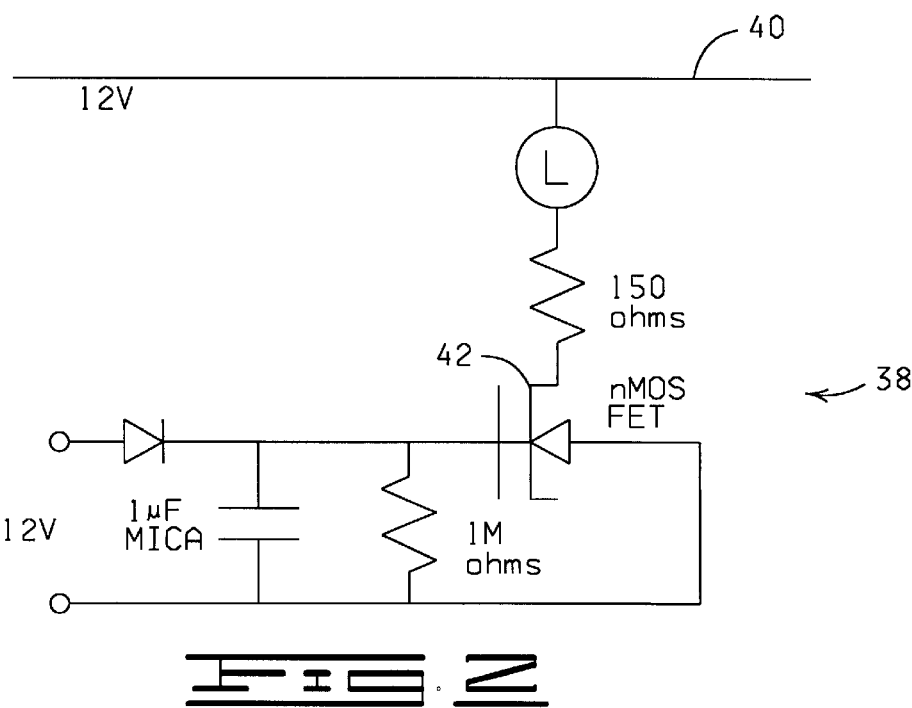
FIG. 2 is a diagram of an electronic circuit of the apparatus.

Referring now to FIG. 2, an example of a suitable electronic circuit 38 for operating the apparatus 10 is shown. The electronic circuit 38 is connected to a trailer's turning signal light circuit 40. The trailer's turning signal light circuit 40 is used by the apparatus 10 as a control, while a tail light circuit (not shown) acts as the power supply. A switch 42 in the electronic circuit 38 senses a trailer's turning signal and connects or disconnects the power to the apparatus 10 depending on whether the trailer's turning signal is on or off. Therefore, the light sources 14 of the apparatus 10 are only turned on when the trailer's taillights are on. This type of electronic circuit 38 provides voltage protection to the apparatus 10.

It will be understood that in other embodiments contemplated by this invention, the design of the electronic circuit as well as its components may be changed.

Referring now to FIGS. 1, 3 and 4, the light source mounting assembly 16 includes a light source mounting bracket 44, a back cover plate 46, and a mounting clamp 48. The light source mounting bracket 44 is a substantially U-shaped plate member having a plurality of openings 50, 52, 54, 56 and 58 formed through one side thereof. The openings 50, 52, 54, 56 and 58 are sized to receive a corresponding one of the light sources 14. As illustrated in FIG. 4, the openings 50, 52, 54, 56 and 58 are formed through the light source mounting bracket 44 at different angles. More specifically, the preferred light source angles in reference to a top 60 of the mounting bracket 44 are 0° for the light source mounted in opening 50 while the opening 52–58 are formed through the light source mounting bracket 44 at angles 59a–59d, respectively. The angle 59a is approximately 2.5°, the angle 59b is approximately 6.2°, the angle 59c is approximately 11.9°, and the angle 59d is approximately 21.8°.

Ends 62 and 64 of the light source mounting bracket 44 are secured to one side 66 of the back cover plate 46 in a suitable manner, such as by welding. The back cover plate 46 is adapted to be secured to the back side 32 of the housing 12 so that the back cover plate 46 extends over the retaining space 28 of the housing 12 with the light source mounting bracket 44 disposed within the retaining space 28. The back cover plate 46 further includes a mounting flange 68 having a pair of holes 70, 72. The mounting flange 68 is adapted to be adjustably connected to the mounting clamp 48.

As shown in FIG. 1, the mounting clamp 48 includes a mounting plate 74, which is attachable to a flat surface on the rear of a trailer or other vehicle, and a pair of parallel, spaced apart plates 76, 78. Each of the plates 76 and 78 includes a hole 80 and 82, respectively, which is alignable with the hole 70 of the mounting flange 68 and an elongated slot 84 and 86, respectively, which is alignable with the hole 72 of the mounting flange 68. The mounting flange 68 is securable to the mounting clamp 48 by inserting a suitable fastening member, such as a pin 87, through the holes 80 and 82 of the mounting clamp 48 and the hole 70 of the mounting flange 68. The mounting flange 68 is further secured to the mounting clamp 48 upon adjusting the angle of the mounting flange 68 relative to the mounting clamp 48 by inserting a suitable fastening member, such as a clamp 89, through the slots 84 and 86 of the mounting clamp 48 and the hole 72 of the mounting flange 68.

Referring again to FIGS. 5 and 6, in use, the apparatus 10 should be mounted on the vehicle in such a location so that the dotted line of reference 34 is substantially coextensive relative to the rear end of the vehicle. Desirably, installation of the apparatus 10 will require only a few screws or bolts, and the apparatus 10 can be mounted on several different types of trailers. Placement of the apparatus 10 should be as low as possible to prevent the vision of another driver being impaired by the beams of light 36. Desirably, the apparatus 10 is mounted to a trailer 88 at a flat surface on a bottom side 90 at the rear end of the trailer 88, which is typically from about 39 to about 43 inches above the ground. The apparatus 10 is designed to work best at this height, which provides an optimum mounting height so that the dotted line of reference 34 is approximately eight feet long beginning 3.75 feet from the edge of the trailer 88. Since an interstate lane is 12 feet wide and the maximum legal width of a non-wide-load trailer is 8.5 feet, the dotted line of reference 34 should appear centered in the adjacent lane.

To produce the desired dotted line of reference 34 evenly spaced over the eight foot distance, the angles of the light sources 14 should be held constant, as any adjustment in angle will slightly distort the spacing of the laser dots on the roadway. However, adjustment of the angles should not be enough to reduce visibility of the dotted line of reference 34. By way of example, at the optimum mounting height, the housing 12 may be mounted at an initial angle, $\theta_0=15.2$, and the angles of the light sources 14 will be adjusted by adding $\theta_0$ to the preferred light source angles in reference to the top 60 of the mounting bracket 44, as shown in FIG. 4. Therefore, the light source angles will be, from top to bottom: $\theta_1=15.2$, $\theta_2=17.7$, $\theta_3=21.4$, $\theta_4=27.1$, $\theta_5=38.0$.

It will be appreciated that the placement of the apparatus on the trailer 88, as well as the laser angles may be changed. Further, the apparatus 10 of the present invention can be used on both the passenger's side of the vehicle, as well as the driver's side of the vehicle. Finally, the apparatus 10 of the present invention can also be employed with passenger cars, vans, recreational vehicles, boats or any vehicle where a visual line of reference can be beneficial in safely operating the vehicle.

As shown in FIG. 6, once the dotted line of reference 34 is visible on the roadway in front of an obstacle, such as a passenger car 92 being passed, the driver of the trailer 88 will know that his vehicle has cleared the obstacle and can proceed to change lanes. This line of reference should be beneficial in reducing accidents resulting from lane changes.

From the above description, it is clear that the present invention is well adapted to carry out the objects and to attain the advantages mentioned herein as well as those inherent in the invention. While a presently preferred embodiments of the invention have been-described for purposes of this disclosure, it will be understood that numerous changes may be made which will readily suggest themselves to those skilled in the art and which are accomplished within the spirit of the invention disclosed and claimed.

What is claimed is:

1. A safety light for a vehicle having a rear end, comprising:
    a housing defining a retaining space, the housing mountable to the vehicle proximate the rear end thereof;
    a light source supported within the retaining space of the housing, the light source capable of projecting a beam of light; and
    means for directing and focusing the beam of light projected by the light source onto a surface on which the vehicle is traveling to form a visual line of reference which is observable by an operator of the vehicle during operation of the vehicle, the visual line of reference being substantially aligned with the rear end of the vehicle and perpendicular to the direction of travel of the vehicle such that the visual line of reference provides an indicator to the operator as to the location of the rear end of the vehicle thereby facilitating the operator in determining the position of an adjacent obstacle relative to the rear end of the vehicle.

2. The safety light of claim 1 further comprising:
a light source mount assembly for supporting the light source in the retaining space of the housing, the light source mount assembly comprising:
a mounting clamp which is adapted to be attached to the rear end of the vehicle;
a back cover plate connected to the mounting clamp and connected to the housing so as to define a back side of the housing; and
a light source mounting bracket connected to the back cover plate, the light source mounting bracket having an opening for receiving the light source.

3. The safety light of claim 1 wherein the light source produces a dotted visual line of reference onto the surface.

4. The safety light of claim 1 wherein the light source is a laser pointer.

5. The safety light of claim 1 wherein the light source projects a colored beam of light.

6. A safety light for a vehicle having a rear end, comprising:
a housing defining a retaining space, the housing mountable to the vehicle proximate the rear end thereof;
a plurality of light sources supported within the retaining space of the housing, each light source capable of projecting a beam of light; and
means for directing and focusing each beam of light projected by the light sources onto a surface on which the vehicle is traveling so that the beams of light cooperate to form a visual line of reference which is observable by an operator of the vehicle during operation of the vehicle, the visual line of reference being substantially aligned with the rear end of the vehicle and perpendicular to the direction of travel of the vehicle such that the visual line of reference provides an indicator to the operator as to the location of the rear end of the vehicle thereby facilitating the operator in determining the position of an adjacent obstacle relative to the rear end of the vehicle.

7. The safety tight of claim 6 further comprising:
a light source mount assembly for supporting the light source in the retaining space of the housing, the light source mount assembly comprising:
a mounting clamp which is adapted to be attached to the rear end of the vehicle;
a back cover plate connected to the mounting clamp and connected to the housing so as to define a back side of the housing; and
a light source mounting bracket connected to the back cover plate, the light source mounting bracket having a plurality of openings for receiving a corresponding one of the light sources.

8. The safety light of claim 6 wherein the light sources produce a dotted visual line of reference onto the surface.

9. The safety light of claim 6 wherein each of the light sources is a laser pointer.

10. The safety light of claim 6 wherein each of the light sources projects a colored beam of light.

11. A safety light in combination with a vehicle having a rear end, the safety light comprising:
a housing having a retaining space, the housing mounted to the vehicle proximate the rear end thereof;
a light source supported within the retaining space of the housing, the light source capable of projecting a beam of light; and
means for directing and focusing the beam of light projected by the light source onto a surface on which the vehicle is traveling to form a visual line of reference which is observable by an operator of the vehicle during operation of the vehicle, the visual line of reference being substantially aligned with the rear end of the vehicle and perpendicular to the direction of travel of the vehicle such that the visual line of reference provides an indicator to the operator as to the location of the rear end of the vehicle thereby facilitating the operator in determining the position of an adjacent obstacle relative to the rear end of the vehicle.

12. The safety light of claim 11 further comprising:
a light source mount assembly for supporting the light source in the retaining space of the housing, the light source mount assembly comprising:
a mounting clamp which is adapted to be attached to the rear end of the vehicle;
a back cover plate connected to the mounting clamp and connected to the housing so as to define a back side of the housing; and
a light source mounting bracket connected to the back cover plate, the light source mounting bracket having a plurality of openings for receiving a corresponding one of the light sources.

13. The safety light of claim 11 wherein the light sources produce a dotted visual line of reference onto the surface.

14. The safety light of claim 11 wherein each of the light sources is a laser pointer.

15. The safety light of claim 11 wherein each of the light sources projects a colored beam of light.

16. A safety light in combination with a vehicle having a rear end and a turn signal, the safety light comprising:
a light source mounted to the vehicle proximate the rear end thereof, the light source capable of projecting a beam of light;
means for directing and focusing the beam of light projected by the light source onto a surface on which the vehicle is traveling to form a visual line of reference which is observable by an operator of the vehicle during operation of the vehicle, the visual line of reference being substantially aligned with the rear end of the vehicle and perpendicular to the direction of travel of the vehicle such that the visual line of reference provides an indicator to the operator as to the location of the rear end of the vehicle thereby facilitating the operator in determining the position of an adjacent obstacle relative to the rear end of the vehicle; and
means for illuminating the light source in response to activation of the turn signal of the vehicle.

17. The safety light of claim 16 wherein the illuminating means causes the light source to be turned off in response to the deactivation of the turn signal of the vehicle.

18. The safety light of claim 16 wherein the light source produces a dotted visual line of reference onto the surface.

19. The safety light of claim 16 wherein the light source is a laser pointer.

20. The safety light of claim 16 wherein the light source projects a colored beam of light.

* * * * *